United States Patent [19]

Ayres et al.

[11] Patent Number: 4,613,484
[45] Date of Patent: Sep. 23, 1986

[54] LOOP REACTOR SETTLING LEG SYSTEM FOR SEPARATION OF SOLID POLYMERS AND LIQUID DILUENT

[75] Inventors: C. A. Ayres, Bartlesville, Okla.; John N. Scott, Jr., McLean, Va.; Fred T. Sherk, Tokyo, Japan

[73] Assignee: Phillips Petroleum Company, Bartlesville, Okla.

[21] Appl. No.: 677,000

[22] Filed: Nov. 30, 1984

[51] Int. Cl.[4] .......................... C08F 6/12; C08F 10/06
[52] U.S. Cl. ..................................... 422/132; 422/255
[58] Field of Search ................................. 422/132, 255

[56] References Cited

U.S. PATENT DOCUMENTS

| | | |
|---|---|---|
| 2,825,721 | 3/1958 | Hogan et al. ........................ 526/106 |
| 3,152,872 | 10/1964 | Scoggin et al. ......................... 34/15 |
| 3,172,737 | 3/1965 | Whittington ......................... 422/133 |
| 3,242,150 | 3/1966 | Scoggin ................................. 526/64 |
| 3,262,922 | 7/1966 | Payne ..................................... 526/68 |
| 3,318,857 | 5/1967 | Dietz ...................................... 526/64 |
| 3,324,093 | 6/1967 | Alleman ............................... 526/64 |
| 4,121,029 | 10/1978 | Irvin et al. ............................ 526/64 |
| 4,424,341 | 1/1984 | Hanson et al. ...................... 528/501 |
| 4,461,889 | 7/1984 | Hanson ............................... 528/498 |

*Primary Examiner*—John Kight
*Assistant Examiner*—M. L. Moore
*Attorney, Agent, or Firm*—J. E. Phillips

[57] ABSTRACT

Method and apparatus for the separation of solid particulate polymer from liquid diluent comprising the use of one or more accumulator legs to which diluent is supplied, and separated diluent is recycled to the polymerization process.

8 Claims, 3 Drawing Figures

LOOP REACTOR SETTLING LEG SYSTEM FOR SEPARATION OF SOLID POLYMERS AND LIQUID DILUENT

FIELD OF THE INVENTION

The invention relates to apparatus for separating solid polymer particles from a polymerization slurry mixture. In another aspect the invention pertains to methods for separating solid polymer particles from a loop polymerization stream. In a further aspect, the invention pertains to methods and apparatus to separate solid particle from diluent, and return the diluent to the polymerization stream. In a related aspect, the invention pertains to apparatus to accumulate solid polymer particles from a loop reactor slurry. In one aspect, the invention pertains to a solids accumulator device.

BACKGROUND OF THE INVENTION

In many polymerization processes for the production of polymers of α-monoolefins, a polymerization stream is formed which is a slurry of particulate polymer solids suspended in a liquid reaction diluent. Exemplary of such processes are those disclosed in U.S. Pat. Nos. 3,172,737 (Whittington, Mar. 9, 1965), 3,242,150 (Scoggin, Mar. 22, 1966), 3,262,922 (Payne, July 26, 1966), 3,318,857 (Dietz, May 9, 1967), 4,121,029 (Irvin and Sherk, Oct. 17, 1978), and 4,424,341 (Hanson and Sherk, Jan. 3, 1984).

A particularly suitable method and apparatus for polymerization of α-monoolefins involves an elongated tubular closed loop (endless loop) reaction zone, such as described in the above listed patents. In such polymerization modes, a catalyst, hydrocarbon diluent, and monomer(s) are added generally continuously to and are moved continuously through a relatively smooth-path endless loop at fluid velocities in the highly turbulent range (such as about 10 to 25 ft per sec). The monomer(s) polymerize and precipitate as a slurry of solid form particulate polymer suspended in the diluent.

In a commercial scale operations, it is desirable to separate the particulate polymer from the diluent in the recovery step in a manner such that the diluent is not exposed to contamination so as to permit recycle of the diluent to the polymerization zone with minimal if any purification.

Typically, in the particle-form polymerization for polyethylene, the composition of the slurry in the reactor is of the order of, by weight, particulate polymer about 30 percent, heat transfer liquid composed of diluent about 68 percent, and monomer about 2 percent, though these proportions can vary considerably.

Separating the particulate polymer from the diluent typically has involved the use of a vertical settling leg or dump leg such that the flow of slurry across the opening thereof provides a zone where the polymer particles can settle to some extent from the diluent. The accumulated slurry of polymer particles and diluent, collected in one or more vertical settling legs, is discharged periodically to a flash chamber wherein the mixture is flashed for substantially complete removal of diluent and any traces of monomer, such as disclosed in U.S. Pat. No. 3,152,872 (Scoggin et al, Oct. 13, 1964). The diluent and any monomer vapors are recovered, condensed, and reused in the polymerization process.

Settling legs have been located variously around the reactor loop, in efforts to obtain efficient settling of the particulate polymers so that the polymer particles can be recovered and the diluent recycled as expeditiously and economically as possible. Nevertheless, settling efficiencies have remained lower than desired.

Heretofore, all of the diluent and monomer in the slurry ultimately has had to be flashed in order to separate the solid particulate polymer.

If sizable reductions in diluent, and corresponding increases in polymer content, could be achieved in the material collected in the settling legs, such would mean sizable increases in reactor efficiencies since significantly less diluent would be subject to flashing, and the consequent necessities of cooling, compression, and condensation for recycle.

BRIEF DESCRIPTION OF THE INVENTION

In accordance with our invention, in particle-form slurry polymerization process in a loop reactor means, we provide settling legs with a diluent recycle line (induction line) out of each settling leg, further preferably employing at least one small stream of feed diluent into each settling leg, which configuration provides improved polymer settling and accumulation efficiencies:

| | Inventive Modes | | | | |
|---|---|---|---|---|---|
| | Diluent Line | | Suggested Number of Settling Legs Per Reactor | | |
| Settling Leg Mode | In | Out | Min. | Broad | Preferred |
| Vertical Leg | Yes | Yes | 1 | 1–8 | 4 |
| Vertical Leg | No | Yes | 1 | 1–8 | 4 |
| Canted (Slanted) Leg | Yes | Yes | 1 | 1–8 | 4 |
| Canted (Slanted) Leg | No | Yes | 1 | 1–8 | 4 |

These modes significantly increase particulate polymer content in the accumulated slurry in the settling legs, and reduce diluent content, assisting in forming a more concentrated slurry, thus reducing significantly the amounts of diluent to be flashed and recovered for recycle. The preferred further feed of diluent into each leg appears to further aid in permitting washing out a portion of the fines and/or catalyst-rich particles back into the loop reaction zone.

OBJECTS OF THE INVENTION

An object of our invention is to provide apparatus suitable for separating the solid particle form polymer from the diluent so as to form a more concentrated slurry to be subjected to flashing.

Another object of the invention is to provide methods to improve the settling efficiencies in collecting particle-form polymer.

Other objects, advantages, and features of the present invention will be apparent to those skilled in the art from the following discussion and the appended drawings.

DETAILED DESCRIPTION OF THE INVENTION

Our invention can be further understood from following the description prepared with particular reference to the Drawings. However, while particular and preferred aspects are shown to the extent feasible on the several drawings, the reasonable and proper scope of our invention should not be limited merely thereto.

Figure 1:
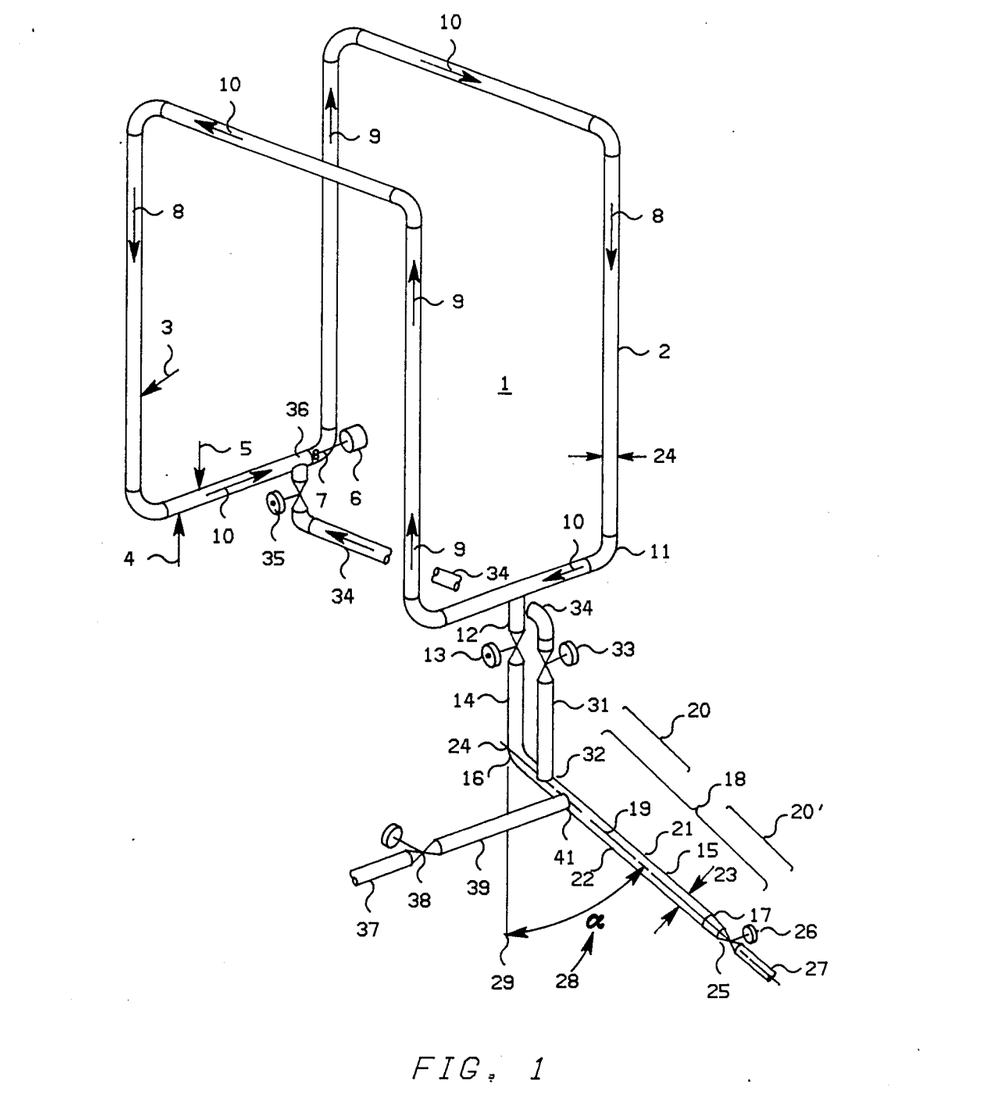
FIG. 1 is an overall schematic perspective view of a loop reactor 1, with a canted or slanted slurry settling leg 15 positioned at angle "α" 28 from the vertical 29, with separated diluent recycle 31, and also showing the optional but preferred further diluent inlet 39.

FIG. 1 shows an overall view of an elongated pipe reactor 1 as an endless loop 2. Feedstreams of catalyst 3, monomer or monomers 4, and diluent, 5, are added at suitable points along the loop 2. While the feedstreams are shown separately for illustration purposes, frequently in practice diluent is combined with catalyst, or monomer, or both, either as a matter of convenience or to assist in metering and controlling amounts of feeds. A loop circulating pump 6 with impeller 7 provide rapid turbulent mixing and high flow circulation rates through the loop 2. The direction of material flow within loop 2 is shown by downwardly pointing vertical arrows 8, upwardly pointing vertical arrows 9, and horizontal arrows 10. The loop reactor 1 is positioned so that its members are generally vertical and horizontal, that is the horizontal members are substantially level, and the risers and downcomers are substantially perpendicular thereto. Thus, the loop reactor 1 defines a flowpath which is essentially vertical or horizontal in each segment, as shown in FIG. 1.

Polymerization of the monomer(s) in the diluent under the influence of the catalyst and polymerization conditions forms a slurry of particulate polymer in the diluent. A portion of the slurry is continuously or periodically drawn off from the reactor loop 2 from a circulating line 11 usually through a relatively short connecting nipple 12 usually generally vertically positioned relative to the loop horizontal line 11, controlled in rate or amount by receiver valve control means 13, through an optional generally vertical slurry line segment 14, also usually vertically positioned relative to loop horizontal line 11, into our receiver or settling leg 15 shown here as a sloped or slanted (canted) leg as one aspect of our invention.

The nipple 12 has a first end in open communication with loop line 10, and a second and opposing end in controlled communication with valve means 13, and a tubular portion therebetween. Valve means 13 is in controlled communication with a first end of short drop line 14. Short drop line 14 has a second and opposing end in open communication with a first end of canted leg 15, and a tubular portion between the ends. Alternatively (not shown), the canted accumulator leg 15 optionally can be operably directly connected via valve control means 13, in communication with slurry line 10, if desired.

Each accumulator leg 15 has a first or upper end portion 16 which is the polymerization slurry receiving end, a second or opposing end portion 17 which is the concentrated slurry accumulating and discharging end portion, and a central portion 18 therebetween of generally elongated tubular construction. Accumulator leg 15 is canted form has an upper side and an opposing under side (in vertical position, respectively a side portion and opposing rear portion). Each leg 15 has a more highly elevated portion 20, and correspondingly a portion of lesser relative elevation 20'. In the central portion 18 of sloped leg 15, there is shown an artificial longitudinal center line 19, defining an upper volume portion 21 above the artificial center line 19, and a lower volume portion 22 below the artificial center line 19 and underneath said upper volume portion 21 and which would be the lower volume of the sloped leg 15 if the sloped receiver leg were positioned in a horizontal plane. The inside diameter 23 of the sloped leg 15 generally is substantially less than that of the inside diameter 24 of loop 2. The length 18 of leg 15 generally is much longer than its diameter.

The accumulator leg 15 concentrated slurry discharge end 17 usually is provided with a relatively short converging tubular segment 25, a discharge control valve means 26 discharging in open communication to a concentrated slurry tubular conveying line 27 which conveys concentrated slurry to a flash chamber and recovery means (not shown). Accumulator leg 15 inside diameter 23 generally is somewhat greater than the inside diameter of concentrated slurry discharge line 27. The short converging connecting segment 25 can be seen more clearly in FIG. 2.

Our settling leg 15 is shown positioned 28 at an angle α from the vertical 29. This angle α can vary as discussed hereinafter.

The polymerization slurry in circulating reactor line 11 continuously passes across the open communication with nipple 12. Some slurry passes therethrough and is received into the particulate accumulating leg 15 wherein the solid particulate particles tend to separate, settle, and slide or tumble downwardly along the lower volume 22 of the canted leg toward the accumulating end volume 17, 25, and with the accompanying polymerization diluent separating generally into the upper volume portion 21 of leg 15, and toward the more highly elevated portion 20 of leg 15. The separating diluent is removed, periodically or preferably substantially continuously, through induction line 31 positioned 32 toward the upper (more highly elevated) portion 20 of leg 15, and in open communication with leg 15. The removal and recycle of separated diluent permits additional slurry to enter the leg 15. The location or position of separated recycle diluent take-off 32 of recycle diluent line 31 on leg 15 preferably is on the upper side of leg 15, as is discussed further with respect to FIGS. 2 and 3. The return of separated recycle diluent 31 is controlled by return control valve means 33 which controls the flow of separated diluent into recycle line 34 and provides shut-off means when the leg 15 is to be dumped. Recycle line 34, preferably with a further flow adjustment means (valve 35 in FIG. 1), conveys recycle diluent into the suction side 36 of reactor circulating pump impeller 7.

In another aspect, not shown, the particulate recovery accumulator leg 15 can be operably connected in direct communication with circulation slurry line 11, preferably on a lower portion thereof, without an intervening portion 12, 14, via control valve means such as 13, and a converging section 24 if needed, to the loop 2.

The rate of turbulent circulation (flow) through loop polymerization reaction slurry line 2 is such as to make location of the receiving leg 15 along the loop 2 substantially immaterial, although it is readily apparent that location of a take-off on a downcomer would usually be considered less suitable than on a horizontal crossover. A practical location along the loop usually is on a horizontal cross-over member 11, convenient to the slurry flash means, and with an induction return 34 convenient to the suction side 36 of the slurry circulating pump impeller 7.

In one mode of our invention, at least one small inflow of diluent 37, controlled in rate by input diluent control valve means 38, is supplied by at least one diluent input feed line 39 to leg 15. The position or location 41 for flowably connecting each further diluent input line 39 to a leg 15 should be within uppermost portion 20 of leg 15, but positioned further forwardly downwardly downstream along leg 15 toward second end 17 than the take-off placement 32 for diluent recycle induction line 31. Further diluent inlet connection 41 should be generally within the upper portion 21, preferably on the uppermost portion of leg 15 when a canted position is employed, as can be seen more clearly on FIG. 2. The at least one inflow of added diluent thus provides a counter-current flow of added diluent relative to the inflow of slurry and relative to the separating particles of polymer.

The further diluent input may be termed a wash flow, or, perhaps more appropriately, a disturbance factor. We have found that a sloped (canted) leg is more effective in separating particulate solids than is a vertical leg, particularly when separated diluent is pulled out and directed back to the loop by an induction return diluent line. In a sloped leg, but also even in a vertical leg, separation efficiencies can be distinctly improved when a further small flow of input diluent is fed into the accumulator leg, below the take-off 32 of recycle separated diluent, and above the normal concentrated particulate polymer level, shown illustratively as jagged line 42 in FIG. 2.

The addition of a portion of the total polymerization diluent feed requirement into a leg 15 appears to assist in washing out a proportion of the particulate polymer fines and/or catalyst-rich particles and carrying them back into the polymerization loop. Preferably, at present, the added diluent is fed over an interval of about half the cycle between take-off of concentrated polymer slurry. Any particles which are relatively small compared to the desired polymer fluff particles tend to be entrained back to the loop reactor stream.

Separating fluff (particulate polymer) forms a concentrated particulate polymer mass which is of variable density depending on the retained diluent content and the degree of separation efficiency. Such concentrated polymer mass usually has a density gradient in that it is somewhat more dense (containing less diluent) in the lower portion thereof, and less dense (containing more diluent) in the upper portion thereof. A fairly clear demarcation would be observable if a test unit were equipped with viewing ports. The "pack level" 42, then, is the volume of separated concentrated particulate polymer/diluent slurry admixture below the separated diluent. Into the "pack" is a continuing fall of particulate polymer and gradual densification thereof.

After discharge of the concentrated slurry contents of an accumulator leg to recovery, there is no pack. Thereafter, the pack gradually accumulates until a pack level is reached again requiring discharge to recovery means.

If on a horizontal surface, the polymer particles would tend to "build up" on the support surface what may be termed "stacks", generally of pyramidal shape or configuration. The acute angle formed between the slope of the pyramid and the base or horizontal surface sometimes is termed the angle of repose, and is influenced by gravity, particle size and character, and the like.

On a sloped surface as in the inside of a sloped leg, similar forces are involved plus the destabilizing effect of the angle $\alpha$ of the accumulator leg. One would assume that the destabilizing effects of the degree of "cant" 28 of the accumulator leg would suffice to avoid particle build-up therein, and that all particles of polymer would simply "fall" or tumble to the lower volume of the accumulator leg.

However, such appears not to be the case. While a sloped leg is a destabilizing factor, nevertheless, it appears that "stacks" or mounds of irregular size still tend to build up to some degree on the interior lower surfaces of the sloped legs, impeding most efficient particulate separation. These particulate piles apparently periodically and suddenly destabilize, creating, it appears, a "cloud" of particles which are kicked back up and tend to flow out with the separated diluent back into the polymerization loop, thus reducing efficiency of separation.

Thus, it appears to us, though we do not wish to be bound by a theory of operation, that the imposition of at least one relatively small in-flow of diluent into the accumulator leg, below or downstream of the outlet of return recycle diluent, and above or upstream of the maximum pack line, tends to provide continuous or semi-continuous disturbance, such that particulate accumulations on the leg surfaces above the desired maximum pack line do not occur, and that the polymer particles separate more readily and properly into the "pack". Surprisingly, even in vertical legs, clear improvement in separation is obtainable. Further, the packs so formed are greater in density, containing less diluent and more polymer, than before achievable. Thus, settling efficiencies are even further improvable in both canted and vertical legs by the added diluent input.

Figure 2:
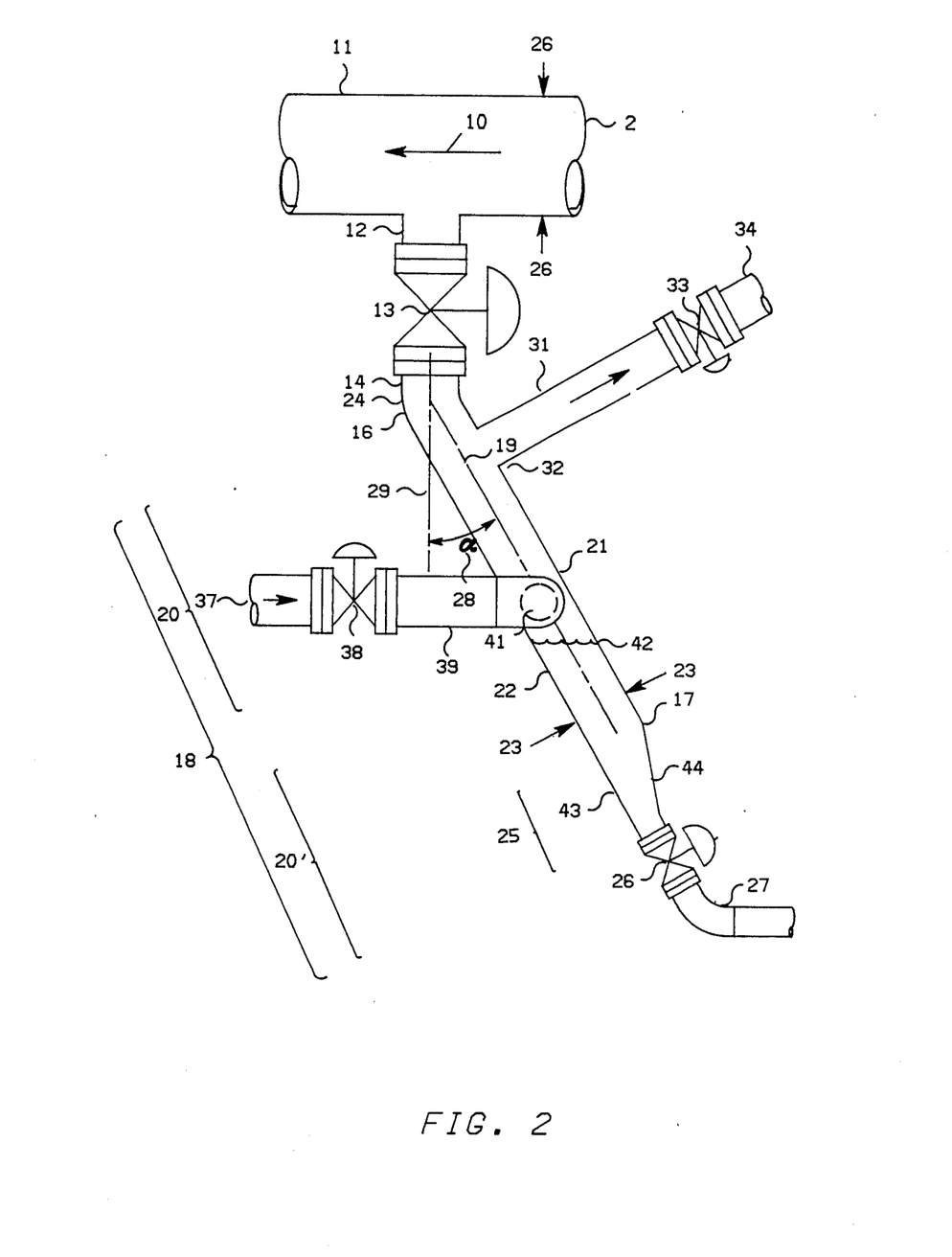
FIG. 2 is an enlarged segmental side view of a canted or slope-positioned settling leg 15 positioned at angle "α" 28 from the vertical 29, with separated diluent recycle 31, and optional further diluent inlet 39.

FIG. 2 is an enlarged segmental side view of a canted slurry-receiving polymer particle-accumulating leg 15 positioned 28 at angle $\alpha$ from the vertical 29. Further shown is a line 42 illustrating the level within the accumulator leg 15 of concentrated slurry below pack line 42, and separating diluent above pack line 42. The illustrative demarcation line 42 is not in fact so sharp since particles are constant by falling into the concentrated material. The pack level is not stationary, of course, since upon blowdown of concentrated particulate slurry, leg 15 thereby is emptied of concentrated slurry, and thereafter gradually refills with separated particulate polymer during operation until the desired height or depth of concentrated slurry is reached for the next blowdown to recovery.

Particulate polymer lower collecting segment 25 is illustrated in FIG. 2 as a presently preferred swedge or eccentric reducer configuration. The eccentric reducer 25 is shown with a first in-line underside portion 43, and a tapered opposing second side portion 44. The underside portion 43 of the eccentric reducer is positioned substantially in conjunction line with the corresponding lower or underside side portion 22 of accumulator leg 15. The upper or second side portion 44 is shown at an angle relative to the corresponding upper surface portion 19 of accumulator leg 15. Commercially available pipe swedges which sharply reduce the internal diameter are quite suitable. We also have found that in a canted leg that a swedge or tapered configuration wherein the inner lower or bottom portion is "in-line" mating with the like portion of the accumulator leg seems to further improve separation of polymer particles from diluent than if both side portions 43 and 44 were uniformly convergent as in a funnel shape relative to the diameter of leg 15 and discharge line 27. Of course, in a vertical leg, choice of a swedge-shape or cone-shape discharge seems unlikely to be material.

To blowdown the concentrated slurry from leg 15, operation can be manual, automatic, or semi-automatic. Valves 13, and 33, and 38 where employed, are closed, and thereafter dump valve 26 is opened, discharging contents of leg 15 to flash tank means (not shown). Operation can be fully manual and operator manipulated, with blowdown accomplished responsive to indicators such as a suitably pressure-resistant sight-glass, slurry concentration monitor, determined time interval, or the like. Operation can be semi-automatic wherein valves are motor-operated and responsive to a central operator-monitored actuation point. Or, operation can be fully automatic with leg blown-down frequency on a demand basis with suitable controllers. Where multiple legs are employed, blowdown preferably is in sequence on a rotating basis for more uniform load on recovery means.

Figure 3:
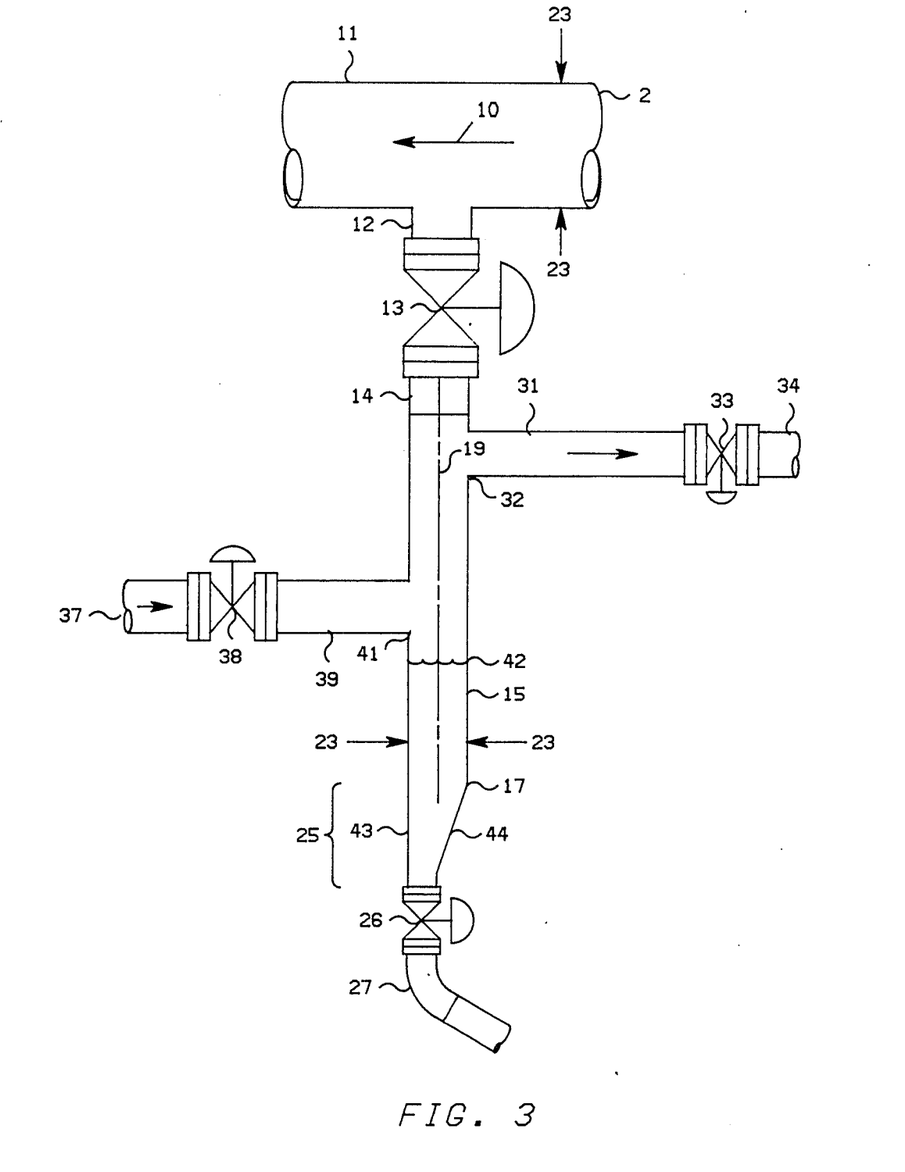
FIG. 3 is an enlarged segmental side view of a vertically positioned particulate solids receiving leg 15 positioned at angle 28 "α" from the vertical 29, wherein angle "α" effectively is 0°, with separated diluent induction recycle 31, and an optional inlet for further diluent 39.

FIG. 3 is an enlarged segmental side view of a slurry-receiving polymer particle-accumulating leg 15 positioned vertically relative to the horizontally positioned loop line 11, that is, $\alpha 28$ is 90° from the horizontal. Further illustrated is internal demarcation (pack line) 42 within leg 15 of concentrated slurry below line 42, and separating diluent above line 42.

Accumulator Legs

The angle $\alpha(28)$ of slope or cant can vary considerably, relative to the vertical, from 0° to about 45°, though presently preferred is about 22.5°.

The relative dimensions of the accumulator leg as to length and inside diameter, can vary widely, depending on the loop reactor line diameter, polymer production rates, desired frequency of leg blowdown, capacity of recovery means, and the like. A ratio of I.D.:length of about 1:9 to 1:16, preferably 1:12 to 1:14, is suggested. On an exemplary basis, we suggest, for a loop reactor of about 20" internal line diameter, a leg internal diameter of about 7.625" and a leg length (18) of about 8 feet; and a return (induction) line about nominal 3", and each inlet line nominal ¾" pipe.

The in-flow diluent rate 39 can vary widely, and should be proportioned relative to the return diluent 31. We suggest as a suitable exemplary ratio about 0.1 lb/lb to about 0.33 lb/lb of inflow/return diluent ratio, and presently preferably about 0.2 lb/lb of inflow/return ratio of diluents.

Of course, the inlet diluent pressure where input diluent is employed should be sufficient relative to the loop reactor system pressure to permit input diluent feed as required.

While we have illustrated and described in one aspect our invention with a single diluent induction line to each leg, multiple induction lines can be used, providing in some cases enhanced "disturbance" effects and improved settling efficiencies. The only recommended proviso is that the communicating entrance 41 of each such diluent in-flow line be above the maximum settling line (42) of concentrated particulate polymer and below the take-off placement (32) of the recycle line. The added inlet lines can be positioned preferably variously around the circumference of the leg, if desired.

Polymerization Process

The method and apparatus of our invention can be used in any pressurized polymerization process requiring a separation of polymer solids from a mixture of these solids in a liquid diluent. It is particularly significant where the diluent is a hydrocarbon which is to be recovered for reuse in a catalytic process. Many monoolefin polymerization processes produce such a slurry where a separation of this nature is required.

The present invention is particularly applicable to slurries resulting from α-monoolefin polymerizations. The α-monoolefin monomers generally employed in such reactions are one or more 1-olefins having up to 8 carbon atoms per molecule and no branching nearer the double bond than the 4-position. Typical examples include ethylene, propylene, butene-1, 1-pentene, and 1-octene, and mixtures such as ethylene and butene-1 or ethylene and hexene-1.

Typical diluents employed in such α-monoolefin polymerizations include hydrocarbons having 3 to 12, preferably 3 to 8, carbon atoms per molecule, such as propane, n-butane, isobutane, n-pentane, isopentane, n-hexane, toluene, isooctane, and the like, and mixtures thereof.

The α-monoolefin(s) is contacted with a suspension of catalyst in a liquid hydrocarbon diluent, employing temperatures and pressures such that substantially all of the polymer produced is insoluble in the diluent and is in solid particle form, the particles being substantially non-tacky and non-agglutinative and suspended in the liquid diluent. The polymerization temperature depends on the hydrocarbons diluent chosen and generally is in the range of about 250° F. and below. The pressure employed is sufficient to maintain the diluent substantially in a liquid phase, normally is about 100 to 700 psia.

The polymerization is carried out in a loop reactor means to which the monomer and diluent are introduced, catalyst is added as a suspension in a hydrocarbon diluent, and the polymerization mixture is circulated by an agitator.

In our separation process and apparatus, valve 26 is closed and valve 13 is opened to allow time for a selected amount of polymer solids to accumulate in the settling leg 15. After the desired amount of solids have accumulated, typically when the settling leg contains such as around 55 weight percent polymer solids, valves 13 and 33 are closed, and also valve 38 where employed, and then valve 26 is opened to allow a pressure drop as the material in the settling leg flows into the additional volume of a filter or flash vessel for recovery procedures as are known in the art. If desired, and presently preferred, the diluent inlet 38 is open over about one-half the cycle time between each concentrated slurry blowdown, being opened a short time after restart of solids accumulation, and closed a short time ahead of the slurry blowdown.

EXAMPLES

Examples provided are intended to assist one skilled in the art to a further understanding of our invention. Particular materials employed should be considered as exemplary and not limitative. The Examples are part of our disclosure. The specification including text, Examples, data, and claims, should be viewed as a whole in considering the reasonable and proper scope of our invention.

EXAMPLE I

The benefits of the present invention can be illustrated using calculations based on typical operating conditions used in the particle-form polymerization of an α-olefin such as ethylene. Assuming that polyethylene is being produced in a loop reactor means at a rate of about 17,500 pounds/hour, when the slurry in the settling leg 15 has thickened to 55 weight percent solids, the leg will contain about 13,818 pounds/hour of isobutane plus about 500 pounds/hour of ethylene. For the purpose of this example, the ethylene is included together with the isobutane as diluent. The conditions in the settling leg, viz. about 650 psia and about 225° F., were such that the diluent was maintained substantially in the liquid phase.

Runs were made employing a loop reactor equipped with two sloped settling legs and two vertical settling legs, each leg located on the bottom of a lower horizontal segment of the loop reactor (total of four settling legs) and employed to make polyethylene by polymerization of ethylene and with a small amount of hexene-1 comonomer in isobutane diluent to form solid flake or fluff type (particle form) polyethylene.

The loop reactor was nominal 20 inches in (outside) diameter with about 0.818 inches in thickness of wall and about 377 feet in total length of the loop. The operating pressure was about 650 psia and the operating polymerization temperature was about 225° F. to 235° F.

Each leg had an internal diameter (23) of about 7.625 inches (nominal 8" line, and an internal length (18) of about 8' 3½". Each sloped leg was positioned at an angle α 28 of 22.5° from the vertical. Each sloped leg was equipped with a valve controlled diluent nominal 3" induction line of 2.9 inches inside diameter and positioned as hereinbefore described from the leg to the loop reactor pump suction.

The vertical and sloped legs were equipped with diluent induction lines, but no diluent lines.

For the runs, the performance of the sloped settling legs was compared with that of the straight settling legs when operating for the production of low density polymer where the polymer particles had poor settling characteristics. The poor settling characteristics of the low density polyethylene fluff necessitated that the loop reactor be run at a production rate of about one half the normal production rate.

The density target for the polyethylene produced was 0.934 to 0.937 gr/cc and the melt index (MI) target was 2.5 to 3.9 (grams). MI is defined as the grams of polymer extruded in 10 minutes through an 0.0825 inch diameter orifice at 190° C. when subjected to a load of 2160 grams.

Steady state operation of the reactor was established using two vertical settling legs, without use of diluent inlet lines, but with the use of diluent recycle (induction) lines, and determining production rate in pounds of polyethylene per hour, the reactor solids in weight percent, isobutane diluent in Lb/Hr recovered and recycled, and the settling efficiency. Settling efficiency is defined as the Lb/Hr of polymer ejected from a settling leg divided by the total of Lb/Hr of polymer plus Lb/Hr of isobutane diluent ejected at the same time from that settling leg.

The second part of the comparative runs consisted of switching operation to the two inventive sloped settling legs, without diluent feed, and with diluent recycle, and again establishing steady state operation of the loop reactor. After 24 hours of steady state operation using the sloped settling legs and determining Lb/Hr production rate, reactor weight percent solids, Lb/Hr flashed and recovered recycle isobutane diluent (e.g., ejected from the settling leg and recovered and recycled), and settling efficiency in percent as previously defined, then these two sloped legs were valved off and operation was returned to the two original vertical settling legs.

The results are shown in Table I:

TABLE I

| Legs in Service | Production Rate Lbs/Hr | Reactor Solids Wt. % | Flashed Isobutane Lb/Hr | Settling Efficiency Percent |
|---|---|---|---|---|
| 2 Vertical | 6900 | 32.3 | 6700 | 53.1 |
| 2 Sloped | 9134 | 32.1 | 5855 | 56.9 |
| 2 Vertical | 7563 | 32.3 | 8604 | 47.9 |

These comparisons demonstrate that at similar reactor weight percent (wt. %) solids that the reactor produced substantially increased production rate of polymer while operating with significantly less flashed isobutane diluent recovered and recycled. The Runs demonstrate the effectiveness of the sloped leg configurations as illustrated in the specification and drawings employing an induction line from the upper portion of the sloped settling leg to the inlet suction of the circulating pump impeller of the loop reactor.

Thus, it is evident that improved settling efficiencies of the sloped legs with diluent induction lines result in significant economic benefits including increased production and reduced isobutane diluent flashed and recovered for recycle.

The disclosure, including data, has illustrated the value and effectiveness of our invention. The examples, the knowledge and background of the field of the invention and the general principles of other applicable sciences have formed the bases from which the broad descriptions of my invention including the range of conditions and formed the bases for out claims here appended.

We claim:
1. An apparatus comprising:
   a loop reactor defining a fluid flowpath and comprising a series of interconnected alternating vertical and horizontal segments defining a flowpath adapted for a particulate solids-diluent slurry, and
   a solids-concentrating device for concentrating said particulate solids from said particulate solids-diluent slurry, comprising in operable sequence,
   a first elongated tube disposed at an angle α of about up to 45° from the vertical relative to said horizontal segments of said loop reactor comprising a first end having an opening defined therein and defining a passage therethrough,
   a second end having an opening defined therein,
   said ends disposed at opposite ends of said first elongated tube, said first elongated tube having a length:diameter ratio greater than 1,
   at least one inlet in said tube adapted for diluent feed thereinto,
   at least one outlet in said first elongated tube adapted for diluent removal, said outlet positioned a first distance from said first end along said first elongated tube, said inlet positioned a second distance along said first elongated tube, wherein said second distance is greater than said first distance;

said second end further connected by fluid-open passage to a first end of a converging member and defining a passage therethrough, and a second elongated the adapted for fluid passage from said outlet to said loop and closably controllably connected to said loop.

2. The apparatus of claim 1 wherein said first elongated tube has a length:inside diameter ratio of about 9:1 to 16:1.

3. The apparatus of claim 2 wherein said first elongated tube has a length:inside diameter ratio of about 12:1 to 14:1.

4. The apparatus of claim 5 wherein said first elongated tube is disposed at an angle $\alpha$ of about 22.5° from the vertical relative to said horizontal segments of said loop reactor.

5. An apparatus comprising:

a loop reactor comprising a series of interconnected alternating vertical and horizontal segments defining a fluid flowpath, and a solids-concentrating device adapted for concentrating particulate solids from a particulate solids-diluent slurry contained in said flowpath, comprising in operable sequence, a first elongated tube disposed at an angle $\alpha$ of about up to 45° from the vertical relative to said horizontal segments of said loop reactor comprising a first end having an opening defined therein, and a second end having an opening defined therein, said ends disposed at opposite ends of said elongated tube, said elongated tube defining a passage therebetween and having a length:diameter ratio greater than 1, an outlet in said tube adapted for liquid removal, said outlet positioned a first distance from said first end along said first elongated tube, said second end controllably connected to a first end of a converging member and defining a passage therethrough, and a second elongated tube adapted for fluid passage from said outlet to said loop and closably controllably connected to said loop.

6. The apparatus of claim 5 wherein said first elongated tube has a length:inside diameter ratio of about 9:1 to 16:1.

7. The apparatus of claim 6 wherein said first elongated tube has a length:inside diameter ratio of about 12:1 to 14:1.

8. The apparatus of claim 7 wherein said first elongated tube is disposed at an angle $\alpha$ of about 22.5° from the vertical relative to said horizontal segments of said loop reactor.

* * * * *

UNITED STATES PATENT AND TRADEMARK OFFICE
CERTIFICATE OF CORRECTION

PATENT NO. : 4,613,484

DATED : September 23, 1986

INVENTOR(S) : C. A. Ayres et al

It is certified that error appears in the above-identified patent and that said Letters Patent is hereby corrected as shown below:

Column 11, claim 4, line 1, "5" should read --- 3 ---.

Signed and Sealed this

Tenth Day of February, 1987

Attest:

DONALD J. QUIGG

*Attesting Officer*   *Commissioner of Patents and Trademarks*